(12) United States Patent
Hawes et al.

(10) Patent No.: US 8,319,829 B2
(45) Date of Patent: Nov. 27, 2012

(54) METHOD AND SYSTEM FOR CONTROLLING THE POSITION OF A MICROSCOPE LENS

(75) Inventors: William Roland Hawes, Hertfordshire (GB); Nigel Ingram Bromley, Milton Keynes (GB)

(73) Assignee: FFEI Limited, Hertfordshire (GB)

( * ) Notice: Subject to any disclaimer, the term of this patent is extended or adjusted under 35 U.S.C. 154(b) by 1195 days.

(21) Appl. No.: 12/121,830

(22) Filed: May 16, 2008

(65) Prior Publication Data

US 2009/0284590 A1    Nov. 19, 2009

(51) Int. Cl.
H04N 7/18 (2006.01)
G02B 26/08 (2006.01)
G02B 26/10 (2006.01)

(52) U.S. Cl. ........................... 348/80; 359/210.1

(58) Field of Classification Search .............. 348/79–80; 359/210.1
See application file for complete search history.

(56) References Cited

U.S. PATENT DOCUMENTS

| 4,863,252 A * | 9/1989 | McCarthy et al. ............ 359/376 |
| 5,009,488 A * | 4/1991 | Fay et al. ..................... 359/889 |
| 5,293,042 A * | 3/1994 | Miyamoto ...................... 850/1 |
| 6,037,583 A | 3/2000 | Moehler et al. |
| 6,057,547 A * | 5/2000 | Park et al. ....................... 850/10 |
| 2003/0089845 A1 | 5/2003 | Widzgowski |
| 2004/0036938 A1 | 2/2004 | Wohlfrom |
| 2006/0007316 A1 | 1/2006 | Yamanaka |
| 2006/0011804 A1 | 1/2006 | Englemann et al. |
| 2006/0279739 A1 | 12/2006 | Yamanaka |
| 2009/0008539 A1 | 1/2009 | Steinert |

FOREIGN PATENT DOCUMENTS

| DE | 197 02 752 A1 | 7/1998 |
| DE | 10 2005 047 200 A1 | 4/2007 |
| EP | 1 389 868 A2 | 2/2004 |
| EP | 1 617 250 A1 | 1/2006 |
| JP | 59-046611 A | 3/1984 |
| JP | 2006-010568 A | 1/2006 |
| JP | 2006-343651 A | 12/2006 |
| JP | 2007147680 A | 6/2007 |

OTHER PUBLICATIONS

Search Report corresponding to 09160403.3-2217 dated Aug. 31, 2009.

* cited by examiner

*Primary Examiner* — George C Neurauter
(74) *Attorney, Agent, or Firm* — Sughrue Mion, PLLC

(57) ABSTRACT

A method for controlling the position of a microscope lens comprising receiving a reference signal corresponding to a reference position of the microscope lens; receiving a measurement signal corresponding to an actual position of the microscope lens; receiving a deviation signal characteristic of a predetermined positional deviation from the reference position; and using the measurement signal, the deviation signal and the reference signal to generate a positional control signal for use in setting the position of the microscope lens.

21 Claims, 8 Drawing Sheets

METHOD AND SYSTEM FOR CONTROLLING THE POSITION OF A MICROSCOPE LENS

FIELD OF THE INVENTION

The present invention relates to a method and a system for controlling the position of a microscope lens. In particular the invention relates to applying a small predetermined positional deviation to a reference position of a microscope objective lens.

BACKGROUND OF THE INVENTION

In the field of microscopes used for scanning biological samples and the like, it is often necessary to refocus the objective lens rapidly in order to compensate for variations in thickness of a biological sample being inspected. This is done by moving the microscope objective lens relative to a support member so as to adjust the distance between the objective lens and the sample. In most cases these refocusing movements represent small movements of the lens around a reference lens position representative of an average focal plane for the biological sample in question.

There are typically three components that make up the motion of such a lens: a relatively slow or static positioning of the lens at a position of optimum focus; a rapid movement limited in space and time that is used as part of a focusing process; and a medium speed movement of the lens around the position of optimum focus in order to generate images of the sample with depth. For example, the relatively slow or static positioning may involve movements of the order of millimeters on a timescale of tens of seconds; the rapid movement may involve movements of the order of 1 micrometer on a timescale of around 200 microseconds; and the medium motion may involve movements of the order of tens of micrometers over a period of around a few milliseconds to 1 second. These movement scales may vary depending upon the size and setup of the microscope apparatus. Each of these movements may be applied individually or may be applied using a composite control signal. Each of the movements must be highly accurate on a micrometer scale in order to accurately focus an image of the sample.

Controlling these components of motion typically presents a problem in the art. Each component of lens motion required for the generation of a high quality image has different characteristics in time and space and hence a control system adapted to control one component is typically not suitable for the control of another component. For example, to maintain a static position requires a control strategy that is typically not suitable for controlling more rapid limited movement. Hence, there is a requirement for a method and system for controlling the position of a microscope lens which allows the above movements to be performed accurately.

SUMMARY OF THE INVENTION

In accordance with a first aspect of the present invention, a method for controlling the position of a microscope lens comprises:
 a. receiving a reference signal corresponding to a reference position of the microscope lens;
 b. receiving a measurement signal corresponding to an actual position of the microscope lens;
 c. receiving a deviation signal characteristic of a predetermined positional deviation from the reference position; and
 d. using the measurement signal, the deviation signal and the reference signal to generate a positional control signal for use in setting the position of the microscope lens.

By using a reference signal in combination with a measurement signal and a deviation signal, a positional control signal can be generated to accurately control the position of a microscope objective lens when applying medium or fast position alterations to a substantially static reference position, wherein the substantially static positioning may involve small movements of the order of millimeters on a timescale of tens of seconds when the medium or fast position alterations may respectively involve movements of the order of tens of micrometers over a period of around a few milliseconds to 1 second and movements of the order of 1 micrometer on a timescale of around 200 microseconds. Commonly, such alterations are limited in time and space.

In a particular embodiment, the generation of a positional control signal involves comparing the measurement signal and the reference signal. Such a comparison may involve an addition or a subtraction. If a modification is made to the measurement signal based on a signal characteristic of the particular effect of the predetermined positional deviation provided by the deviation signal, i.e. a displacement element of the deviation signal, then feedback control to maintain the microscope lens at a reference position can still be used even if medium to fast speed deviations to the reference position are also applied. Typically, such a method will also involve generating the positional control signal using the deviation control signal after the measurement signal has been compared with the reference signal.

As most common feedback circuits are designed to maintain a reference position, and have control characteristics that are only suitable for maintaining said reference position in response to small random impulse disturbances, it is generally impossible to apply a fast or medium speed deviation from this reference position without generating unwanted non-linear dynamics. However, using the present invention, the input measurement signal and the output positional signal are modified outside of the application of the control processing and hence these deviations can be applied without generating the unwanted dynamics.

In one embodiment the method may comprise modifying the measurement signal using the deviation signal to produce a modified measurement signal, wherein the measurement signal may be modified based on a predicted displacement signal calculated from the deviation signal. Such a method may also comprise comparing the modified measurement signal and the reference signal to produce a comparative signal and summing the comparative signal and the deviation signal to generate the positional control signal.

In an alternative embodiment, the deviation signal may be calculated from a displacement signal, wherein the method may then comprise modifying the measurement signal using the displacement signal to produce a modified measurement signal. In certain embodiments the modified measurement signal and the reference signal may be compared to produce a comparative signal, wherein said comparative signal and the deviation signal may be summed to generate the positional control signal.

In another preferred embodiment, the microscope lens is coupled to a linear actuator which generates movement along a linear axis. This linear actuator may be one of a voice coil actuator a piezoelectric actuator, or a rack and pinion system. The optical axis of the lens may be collinear with the axis of motion of the linear actuator. Typically, the positional control signal is an analogue electrical current signal which is sent to the linear actuator, although this signal may alternatively be an analogue voltage signal or a digital current or voltage signal.

When using a linear actuator in the form of a voice coil actuator the control provided by the present invention becomes even more important. In order for such a linear actuator to maintain a static position a constant current must be supplied. The presence of natural statistical variations in the current signal supplied to the linear actuator and/or movement of the assembly containing the microscope lens require a comprehensive and accurate control system to maintain a static position. When using such a system the present invention allows scanning operations involving medium to fast motions to be applied without loosing the accuracy of the control system used to maintain a static position. A medium speed change in lens position may be representative of a short range scan operation to generate images of a sample with depth. In such a case the deviation signal may comprise a periodic signal such as a saw-tooth waveform. In other cases the signal may be provided when using such a medium speed scanning pattern the method of the present invention provides a synergetic effect by accurately controlling any gradual motion and keeping the actual motion of the lens in line with the medium speed components of any deviation waveform. In other situations wherein a fast speed deviation is required the deviation signal may also comprise an impulse signal.

In accordance with a second aspect of the present invention a system for controlling the position of a microscope lens comprises:

a receiver for receiving a reference signal, a measurement signal, and a deviation signal, the reference signal corresponding to a reference position of the microscope lens, the measurement signal corresponding to an actual position of the microscope lens, and the deviation signal characteristic of a predetermined positional deviation of the microscope lens from a reference position; and a controller for generating a positional control signal for use in setting the position of the microscope lens based upon the signals received by the receiver.

This system may be adapted to perform the method of the first aspect of the invention or any variation of said method described herein by using a receiver and controller configured as specified above a control system can provide the beneficial effects discussed in relation to the first aspect of the invention. In some embodiments the controller may further comprise a comparator for performing a comparison between the measurement signal and the reference signal. This comparison allows a positional control signal to be generated and this positional control signal may be further filtered through a loop composition filter that is provided as part of the controller.

In a preferred embodiment the controller is configured to modify the measurement signal to generate the positional signal using the deviation signal; the former modification may be based on a signal characteristic of the predicted effect of the predetermined positional deviation, which may be subtracted from the measurement signal before generating the positional control signal, and the controller may also be configured to generate the positional control signal using the deviation signal by adding a signal used to produce the predetermined positional deviation to the positional control signal before sending the positional control signal to set the position of a microscopic lens.

In some embodiments the receiver and controller may form part of a feedback control system. In other embodiments they may be used as an additional stand along control system. The feedback control system may also be integrated with a deviation signal generator for producing a deviation signal and an encoder for generating a measurement signal reflective of the actual position of the microscope lens. In other embodiments the system may comprise a displacement signal generator adapted to generate a displacement signal, wherein the deviation signal is generated based on the displacement signal. By using this apparatus the control system can interface with software used to produce an image of a biological sample and the hardware of the microscope lens assembly.

In a preferred embodiment the system further comprises a linear actuator for controlling the position of the microscope lens along a linear axis in response to a positional control signal. In a typical case the microscope lens is mounted within a lens mounting and the lens mounting is operably connected to the linear actuator. If the linear axis of the linear actuator is coaxial with an optical axis of the microscope lens then movement of the lens mounting by the linear actuator will move the microscope lens in and out of focus. In certain situations the linear actuator may comprise a voice coil actuator, in which case the positional control signal may comprise a modulated electrical current signal.

BRIEF DESCRIPTION OF THE DRAWINGS

An example of a method for controlling the position of a microscope lens and an example of a system for performing the same according to the present invention will now be described with reference to the accompanying drawings, in which:—

Figure 1:
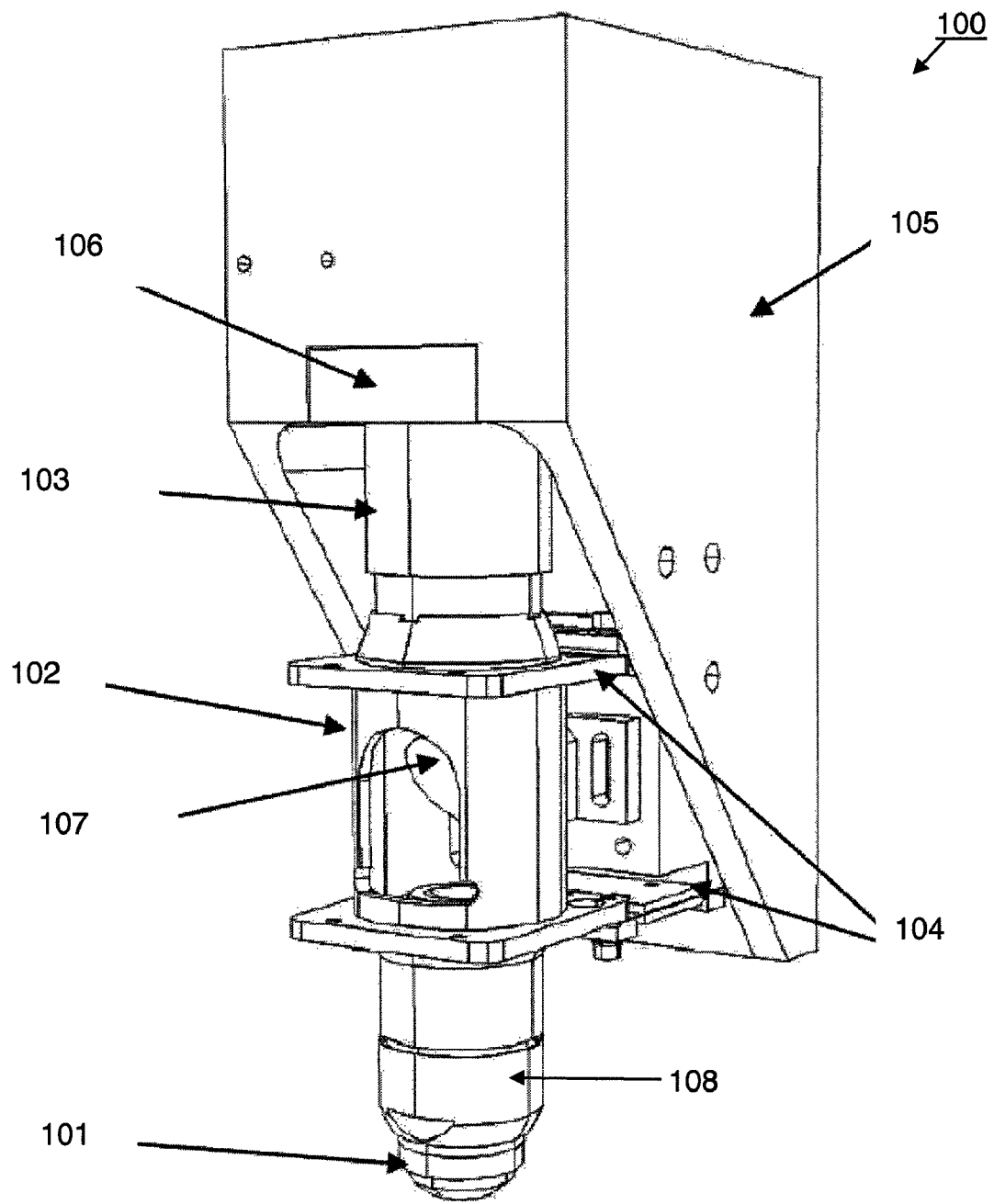
FIG. 1 is a perspective view from one side of an exemplary microscope lens support assembly complete with voice coil that may be used in conjunction with the present invention.

An example of microscope objective lens support assembly for use with the method and system of the present invention is shown in FIG. 1. Such a system is shown for example only and different configurations that comprise a different type of microscope lens and/or different drive mechanisms may also be used. The objective lens support assembly 100 of FIG. 1 has an objective lens 101 mounted at the bottom of the assembly. The objective lens 101 is supported in a barrel 108 and is typically held in position within the barrel 108 by a screw thread. The barrel 108 is then also mounted within a main body 102 of the lens assembly using a second screw thread 110, as may be seen in FIG. 2. The main body 102 is located above the objective microscope lens 101 and contains a mirror 107. The mirror is angled so as to reflect light from the main body 102 into suitably configured receiving apparatus (not shown). The main body 102 is mounted between two leaf springs 104 which can flex to allow the main body 102 to substantially move along a linear axis 115 defined by the vertical. This linear axis is visible in FIG. 2.

Above the main body 102 is mounted a linear actuator in the form of a voice coil actuator 103. This voice coil actuator is typically a standard "off the shelf" item, in this example manufactured by BEI Technologies Inc. The voice coil actuator 103 is mounted directly above the main body 102 so that the centre of gravity of the main body 102, the lens 101 and the voice coil actuator 103 are collinear. This then places the centre of gravity of all components directly upon the linear axis 115 along which the voice coil actuator provides movement. Above the voice coil actuator 103 is mounted a voice coil actuator adjustment block 106. This adjustment block 106 allows the mechanical and dynamic properties of the voice coil actuator to be tailored to a specific lens assembly. The leaf spring 104 and the voice coil adjustment block 106 are both mounted to voice coil 105. This bracket is typically made from a close grained grey cast iron which provides a dense material to dampen any unwanted vibrations and to resist compaction under an upwards or recoil force generated by the voice coil actuator 103.

Figure 2:
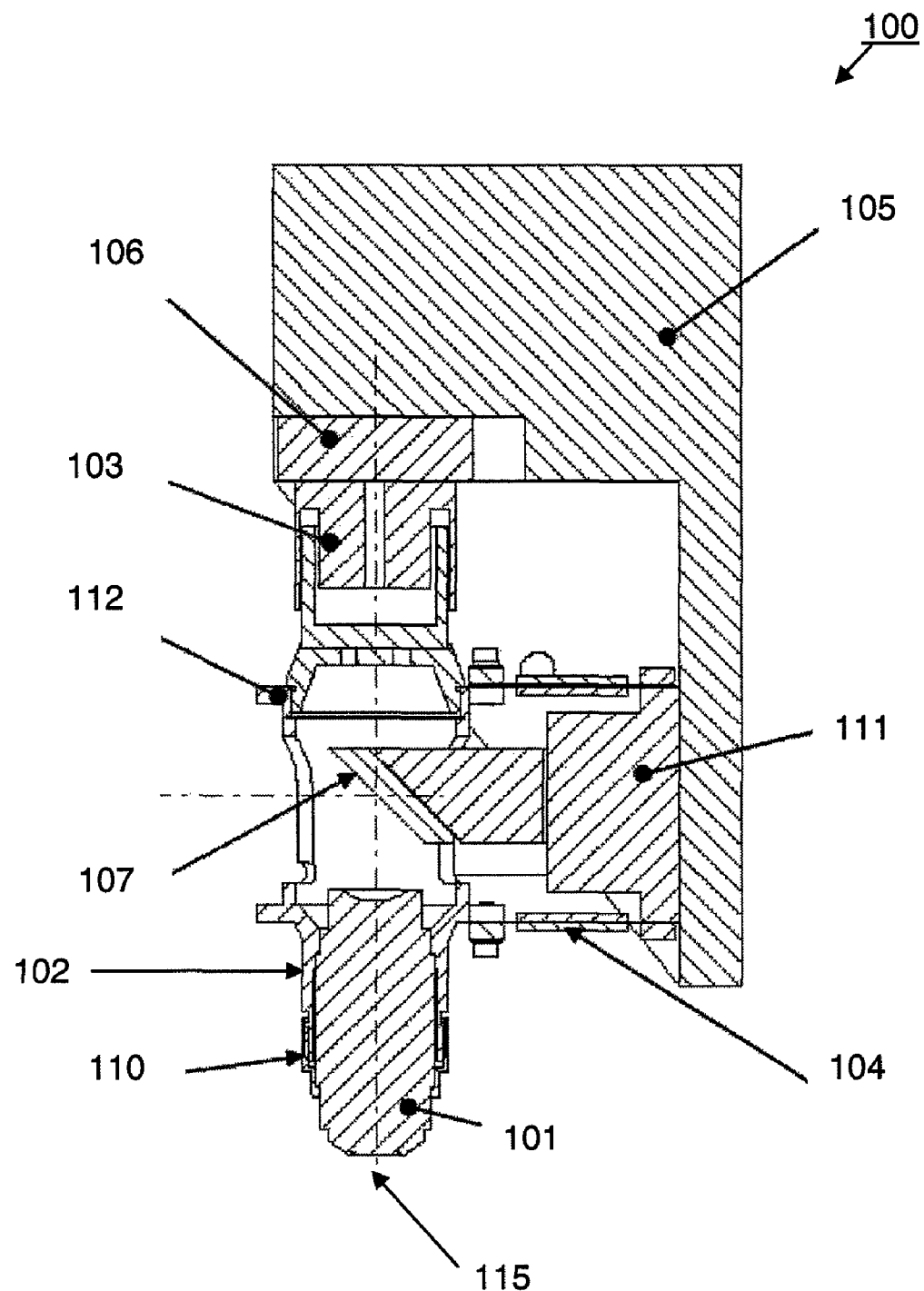
FIG. 2 is a cross-section through the same exemplary microscope lens support assembly that may be used in conjunction with the present invention.

A cross-section of the same assembly 100 is shown in FIG. 2. In FIG. 2 the thread assembly 110 used to mount the objective lens 101 within barrel 102 can be seen. Also visible is linear axis 115 along which the voice call axis 103 is configured to move. As can be seen from FIG. 2, leaf springs 104 are mounted to voice coil mounting bracket 105 via a flexural base 111. Mirror 107 is also connected to this same flexural base 111.

Figure 5:
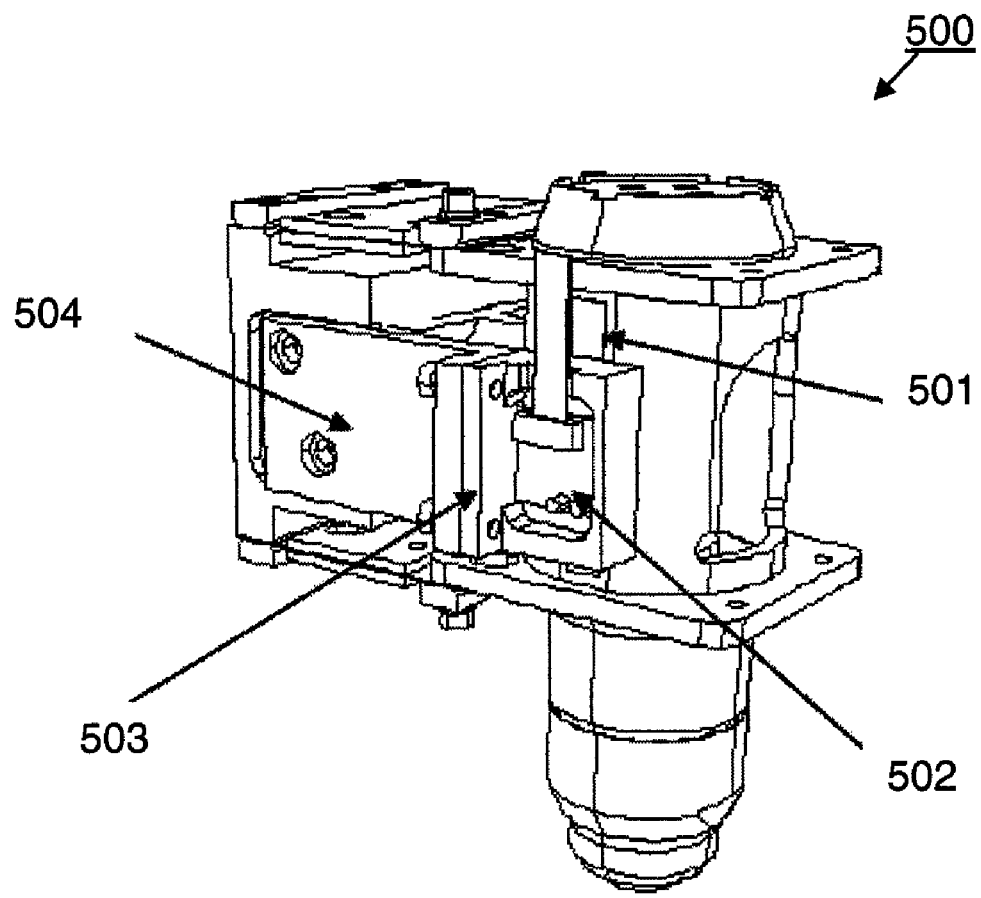
FIG. 5 is a perspective view of an exemplary position encoder that may be used to measure lens position.

The voice coil actuator 103 is capable of applying a known force in proportion to the current supplied to the actuator. However, it is not capable of holding a static position. To enable the voice coil actuator 103 to maintain a static position a position encoder is used to measure the position of the objective lens in use so that a positional control feedback loop can be established. An example of a suitable position encoder is shown in FIG. 5. Encoder assembly 500 comprises encoder strip 501, encoder 502, encoder housing 503 and encoder mounting bracket 504. The housing 503 allows a suitable alignment adjustment to be made to the encoder in order to provide an accurate positional measurement. Encoder assembly 500 may be provided by a Renishaw system.

Figure 3A:
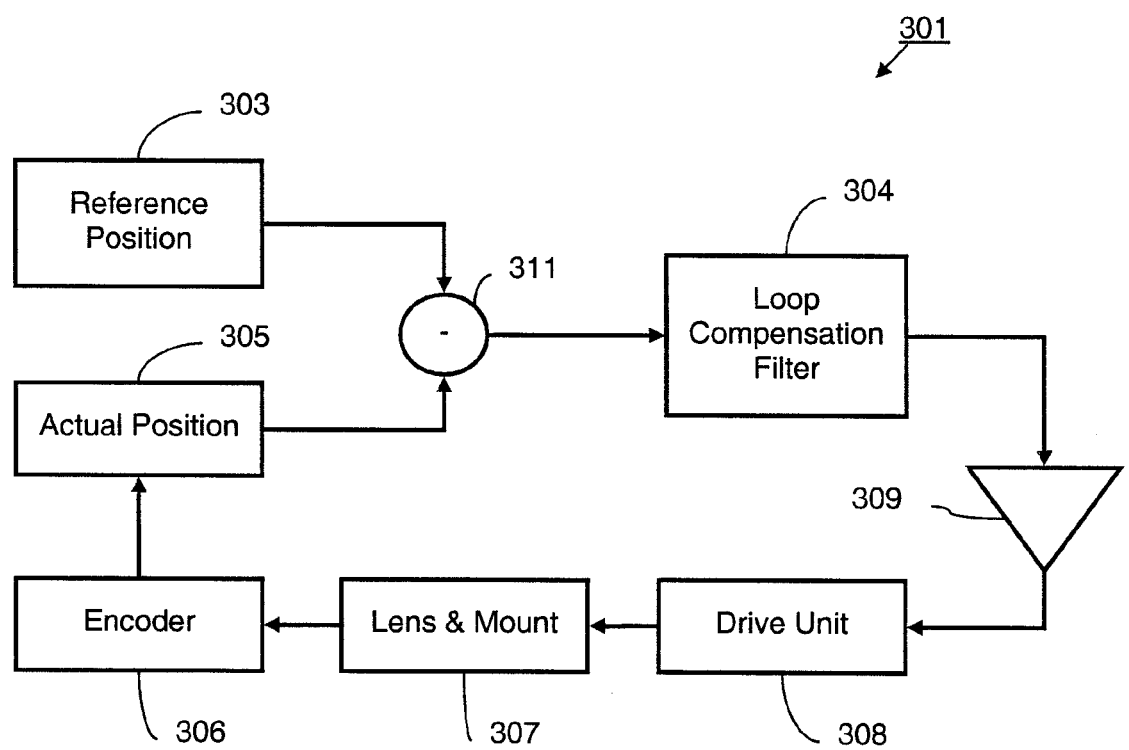
FIG. 3A shows an exemplary control system for maintaining a static lens position that may be integrated into the control system of the present invention.

The controller used to establish the positional control feedback loop to maintain a fixed position of the objective lens is shown in FIG. 3A. The feedback loop begins with a reference position 303, typically provided by the imaging control software. This is used to send a suitable control signal to the drive unit 308 of the voice actuator coil 103 by way of a loop compensation filter 304 and an amplifier 309. The loop compensation filter converts a signal related to a position to a signal suitable for controlling the drive unit. The amplifier 309 and the loop compensation filter 304 are standard components of most feedback control loops; the amplifier 309 provides the loop gain so that small errors can produce control signals with enough power to make the corrective movements and the loop compensation filter 304 modifies the loop response to retain stability within the feedback loop. In use, the drive unit 308 will cause the voice coil actuator 103 to move along the linear axis 115 which will in turn move the lens and mount, collectively here referred to as item 307. The lens and mount control block 307 represents the effect of the lens 101, barrel 108, and main body 102 on the dynamics of the assembly 100. The movement of the lens and mount 307 is recorded by the encoder electronics 306 which form part of the encoder assembly 500. This then enables an actual position 305 of the objective microscope lens to be calculated. The actual position 305 is then compared with the reference position 303 in order to adjust the current supplied to the drive unit 308 of voice coil actuator 103 to maintain the objective lens 101 at the required position. Typically, this comparison is performed by subtracting the actual position 305 from the reference position 303 at comparator 311 and then using the difference of the reference position 303 and the actual position 305 to control the drive unit 308.

The control loop shown in FIG. 3A provides accurate control to maintain a correct lens position at low speed, however it is not able to respond fast enough to control the lens position during medium to fast speed movements. As discussed above, maintaining a correct lens position at low speed may involve movements of the order of millimeters on a timescale of tens of seconds; whereas rapid or fast movements may involve movements of the order of 1 micrometer on a timescale of around 200 microseconds and medium speed motions may involve movements of the order of tens of micrometers over a period of around a few milliseconds to 1 second. It is not possible to produce these faster movements by simply adding them to the reference position 303, as if this is performed the shape of the faster movements would be distorted by the components of the control loop and accurate control would be lost. The addition of these fast movements into a control loop designed to maintain a static position may also produce unwanted non-linear dynamics which may disturb the position of the objective lens 101 and thus move an image of a sample below the lens out of focus.

For low speed movements, as controlled by the control loop of FIG. 3A, the behaviour of the lens and its mount 307, in the absence of any force from the voice coil actuator, is mainly determined by gravity and by residual forces in the support system for the mount. These residual forces can be calculated by considering the mechanics of the leaf spring or "flexure" mounting support. However, for faster movements that are limited in space and time the behaviour of the lens and the lens mount 307 is mainly determined by the dynamics of their mass and any applied force. These dynamics can be well controlled with reasonable accuracy by applying the correct pattern of force in the form of a correct pattern of current for the drive unit 308 of the voice coil actuator 103. This current pattern can be provided in the form of a deviation signal which is characteristic of a predetermined positional deviation from the reference position. Typically the positional deviation varies with time, e.g. a small displacement away from a reference position of the lens that changes with time and eventually returns to the reference position, and thus the deviation signal is a dynamic signal.

It is not possible to simply add this deviation signal to the current signal used to supply the drive unit 308. This is because the control loop will then make some partial attempt to correct for what it sees as a disturbance introduced by the deviation signal. Hence, to apply the faster movement required for finding an optimum focus position and generating images with depth the control system of FIG. 3B is required.

Figure 3B:
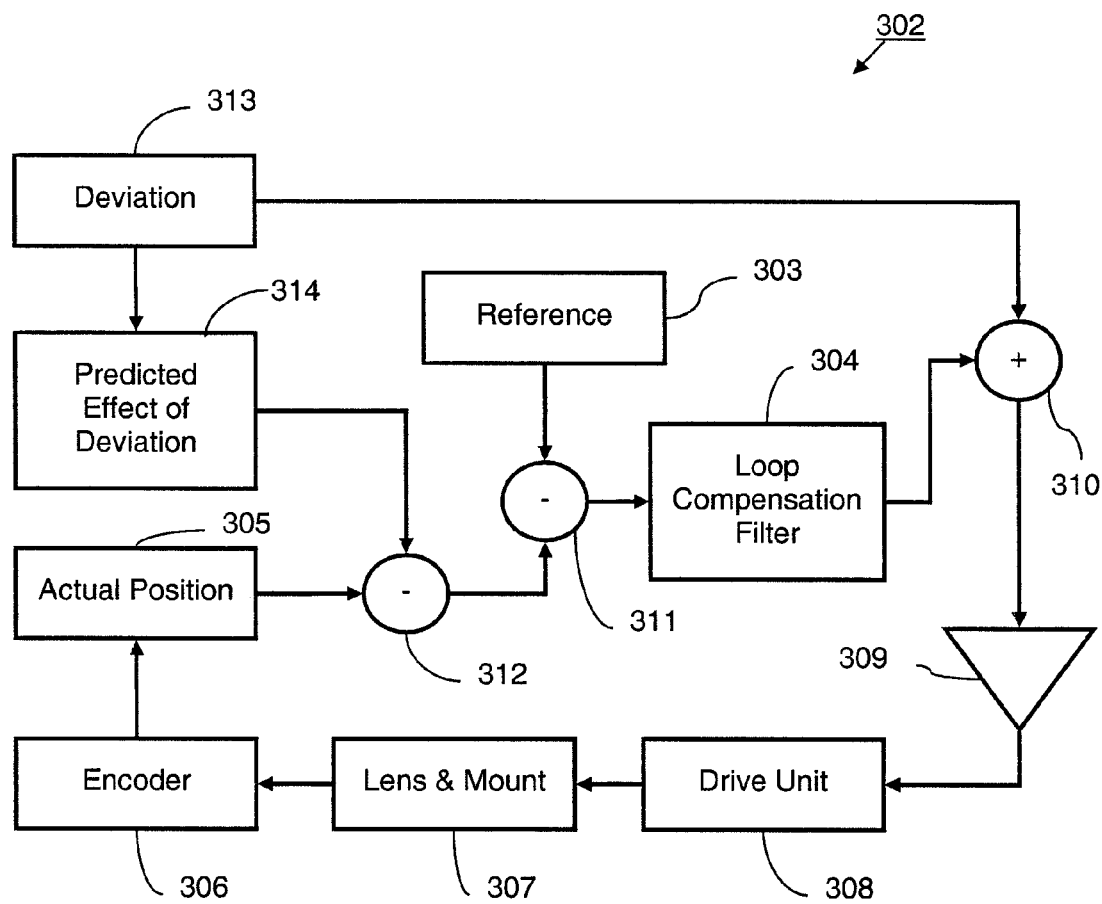
FIG. 3B shows an exemplary control system that can be used to implement the present invention.

In addition to the control elements of FIG. 3A the control system of FIG. 3B further comprises a deviation signal source 313, calculation means 314 to calculate the predicted effect of the deviation signal on the position of the lens, and summation or comparison elements 310 and 312. The deviation signal source 313 outputs a component of the drive signal in the form of a deviation signal, which is eventually used to drive the drive unit 308. This signal component is sent from the deviation signal source 313 to summation element 310. The signal component produced by the deviation signal source 313 is also sent to calculation means 314, which is adapted to calculate a positional displacement to be used in the control loop. This displacement is calculated based on the motion of the lens and lens mount 307 that would be expected if the signal component were to be applied to the drive unit 308. In certain embodiments the calculation means 314 uses a look-up table with predicted displacement measurements indexed by particular signal component ranges. Such a table may be pre-calculated in the design stage. In other embodiments the calculation means 314 solves electro-mechanical equations in real time to generate the predicted displacement measurements. Hence, in the case of FIG. 3B the deviation signal will be correlated with or characteristic of the resultant positional deviation, but the waveform that makes up the deviation signal need not resemble the waveform of the resultant motion. The deviation signal may be a voltage signal or a current signal.

Figure 4:
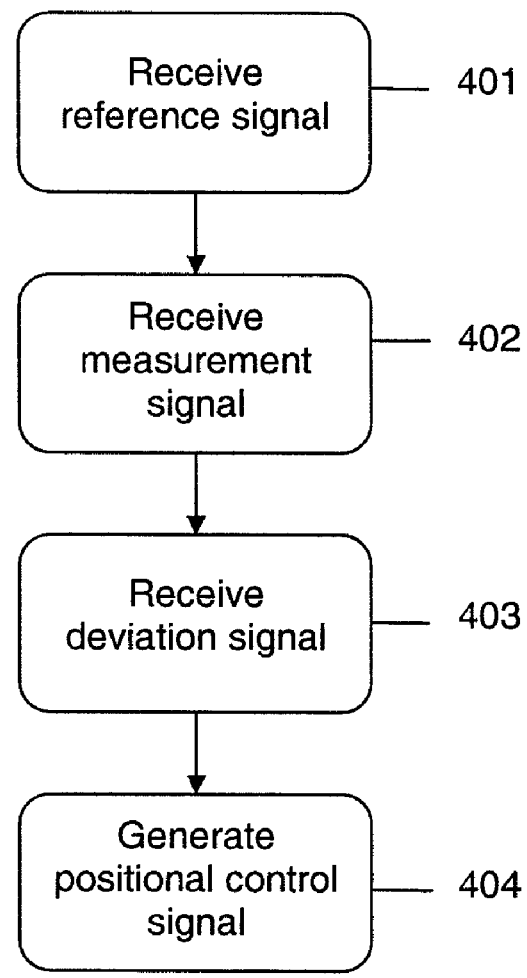
FIG. 4 is a flow chart showing an exemplary method according to the present invention.

In order to prevent the feedback loop of FIG. 3A from compensating for the applied deviation signal the predicted effect of the deviation calculated by calculation means 314 is subtracted from the signal representative of the actual position 305 of the lens at summation point 312. A modified measurement signal reflective of the subtraction of the predicted effect of the deviation from the actual position 315 is then compared with reference signal 303 at summation point 311. The deviation signal itself is added to the result of this comparison, after the result has passed through the loop compensation filter 304, at summation point 310 to generate a resultant positional control signal which is passed to the amplifier 309 and is used to drive the drive unit 308 of the voice coil actuator 103. Hence, in operation the steps of FIG. 4 are performed: a reference signal 303 is first supplied to hold the lens and lens mount at a stable position; a measurement signal is then received at step 402 representative of the actual position 305; if a deviation is to be applied, a deviation signal is applied at step 403 and the eventual positional control signal is then generated at step 404 using the control circuit of FIG. 3B.

Figure 3C:
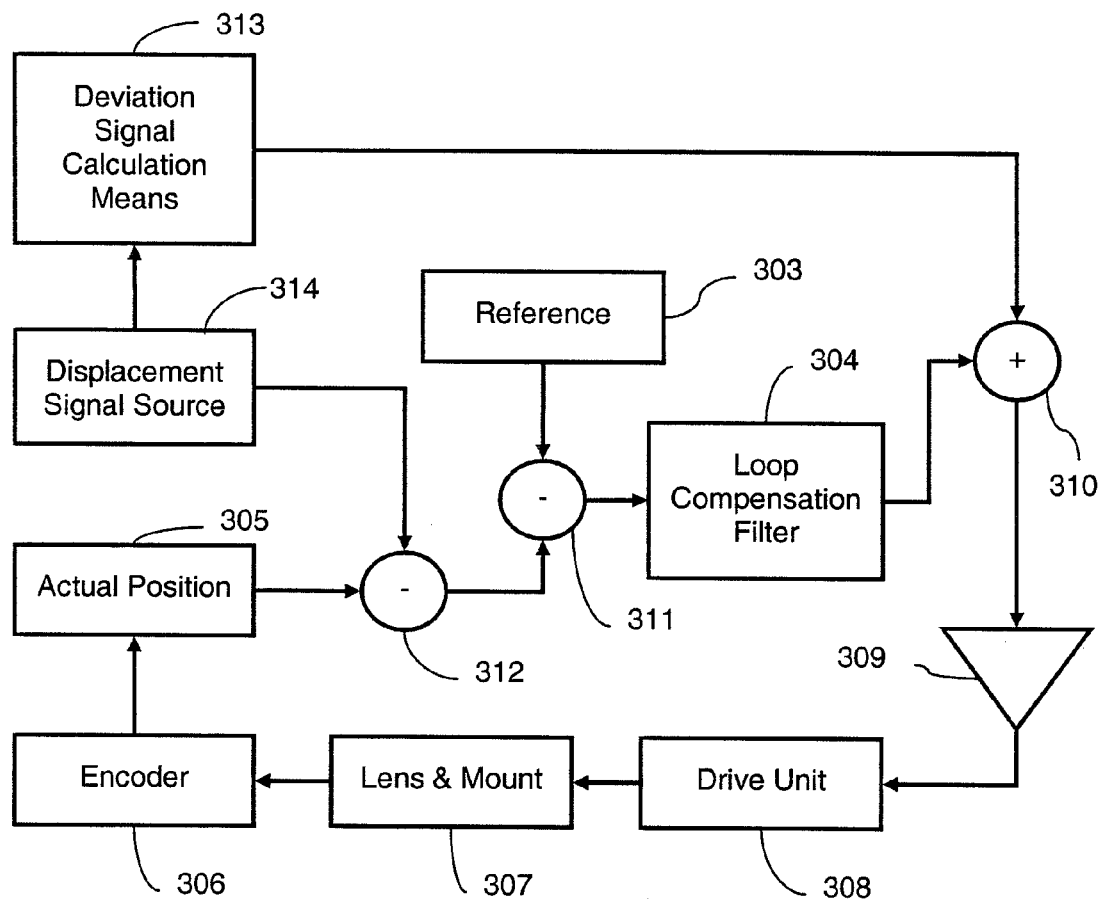
FIG. 3C shows a variation of the control system of FIG. 3B.

A variation of the control system of FIG. 3B is shown in FIG. 3C. In this variation all components apart from elements 313 and 314 are identical to those shown in FIG. 3B and described above. However, in the variation of FIG. 3C the predicted effect of the deviation, i.e. a displacement signal, is supplied as an input to the system instead of a deviation signal. Displacement signal source 314 generates a displacement signal that corresponds to the required positional deviation of the lens and lens mount 307. Displacement signal source 314 then sends this displacement signal to deviation signal calculation means 313, which calculates the deviation signal required for the drive unit 308 to produce the displacement required from the displacement signal, i.e. the predicted deviation required for the displacement. The deviation signal calculation means 313 then sends the deviation signal to summation element 310, wherein it is combined with other drive signal components to produce a drive signal that is used to drive the drive unit 308. Like the previous system of FIG. 3B the deviation signal may be a voltage or current signal and the calculations performed by the deviation signal calculation means 313 may involve the use of a look-up table or the solution of electro-mechanical equations. A choice is typically made between the control system of FIG. 3B and the control system of FIG. 3C, however, in practice, either can be used to implement the present invention, depending on specific implementation requirements.

When the deviation signal is characteristic of a fast movement limited in time and space, the control system of FIG. 3B or 3C allows the fast motion to be applied dynamically and the reference or base position to be maintained using the encoder and the feed back features of FIG. 3A after the fast motion has been applied. The control system of FIG. 3B or 3C operates so as to generate the two motions independently. Thus a fast movement can be used to find the best focal position without compromising an original optimal best focus position as held by the static position and feedback loop.

Figure 6:
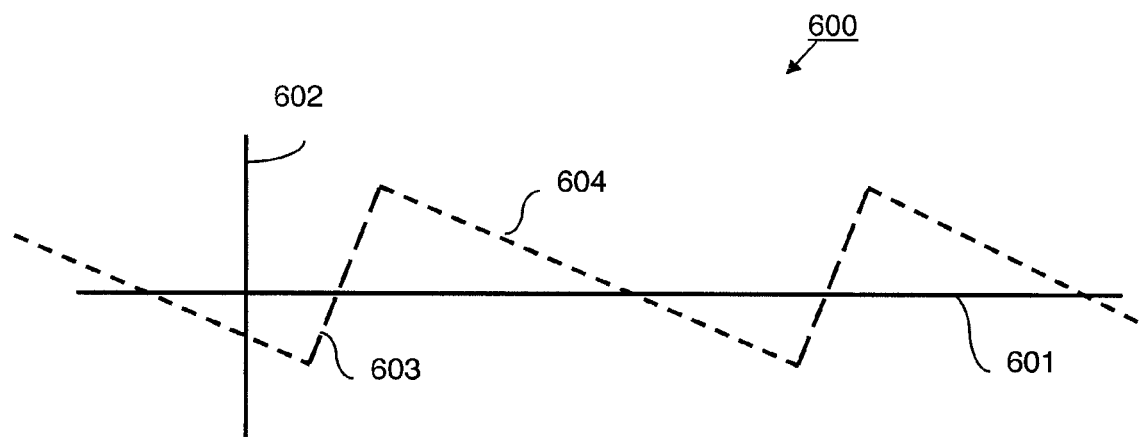
FIG. 6 is an example of a waveform that may be used to produce a deviation signal.

The system of FIG. 3B or 3C also provides an additional surprising synergetic effect when performing a short range position scan around a fixed focus position. FIG. 6 shows an example of a waveform that may be used to produce such a short range scan. The waveform 600 of FIG. 6 comprises a saw-tooth like waveform, wherein the horizontal axis represents time and the vertical axis represents a deviation from a reference position along linear axis 115. The waveform has a fast speed component 603 and a medium speed component 604: the fast or rapid speed component in one direction may represent a fly-back procedure which is then followed by a more gradual scan motion in an opposite direction. Whist this waveform represents the motion of the lens the deviation signal used to generate such motion may differ in form, for example the deviation signal may resemble the double differential of the waveform.

It is possible to apply such a motion using a separate dynamic control system working independently of a static control system. However when a separate dynamic control system is used it becomes difficult to control the slower motion presented by wave-portion 604. To move a mass rapidly for a small distance and then stop it again requires a large force, which can be applied in a separate dynamic control system. Due to the large size of the required force it is possible to rapidly move the lens by a required distance, even if the only values available for the mass of the lens and the applied force are rough approximations. This is typically due to the fact that any errors introduced by other uncontrolled forces such as gravity and the support system are negligible when compared to the size of the applied force. To provide longer, slower movements typically requires a static control system to apply a set of smaller forces to the lens. These smaller forces are comparable to or smaller than the uncontrolled forces, such as those generated by gravity and the support system, which means that the uncontrolled forces can introduce uncertainty into the longer, slower movements. Hence, it is clear that, if used in combination, the requirements of a separate dynamic control system would be at odds with the requirements of a separate static control system. The present invention makes it possible to create and control the small, fast movements with an open-loop process relying only on simple force and acceleration calculations and then also allows control of slower, longer movements using a closed-loop process. The combination of open and closed loop control for the varying movements enables accurate control of the lens whilst preventing the system drifting slowly away from a set operating point.

When using the control system of FIG. 3B or 3C the feedback loop will correct for any errors during the slow motion 604. As the predicted positional effect of the deviation 314 is subtracted from the measurement of the lens position 305 provided by the encoder 300 any error in positioning of the lens during the scan portion of the waveform 604 will result in an error signal being produced as a result of the comparison performed by summation point 311. The features of the static motion feedback loop shown in FIG. 3A then operate to reduce this error. This results in a motion of the lens and mount 307 that follows the required deviation. In FIG. 3B or 3C the elements of the feedback loop of FIG. 3A thus control the medium to slow motions in ignorance of the deviation signal, believing the generated error is being corrected to maintain a static position rather than a medium to slow motion. Hence as well as providing accurate control for rapid, impulse like motions, the present invention also allows the control of slower motions around a fixed reference position.

The advantage of the present invention is that it allows a combination of open-loop dynamic control of fast movements limited in space and time yet retains closed-loop feedback control for longer term "static" positioning.

What is claimed is:

1. A method for controlling the position of a microscope lens comprising:
   a. receiving a reference signal corresponding to a reference position of the microscope lens;
   b. receiving a measurement signal corresponding to an actual position of the microscope lens;
   c. using the reference signal and the measurement signal to generate a positional control signal for use in setting the position of the microscope lens within a closed feedback control loop;
   d. receiving signal data characteristic of a positional deviation from the reference position, the signal data having a positional component and a drive component;
   e. modifying the measurement signal using the positional component to produce a modified measurement signal;
   f. generating the positional control signal by comparing the modified measurement signal to the reference signal to prevent the control loop from compensating for the positional deviation; and
   g. using the drive component and the positional control signal to effect the positional deviation of the microscope lens.

2. The method of claim 1, wherein step e) comprises comparing the modified measurement signal and the reference signal to produce a comparative signal.

3. The method of claim 2, wherein step e) further comprises summing the comparative signal and the drive component to generate the positional control signal.

4. The method of claim 1, wherein the positional component comprises a predicted displacement signal calculated from the drive component.

5. The method of claim 1, wherein step g) further comprises sending a resultant positional control signal to a linear actuator coupled to the microscope lens.

6. The method of claim 1, wherein the positional deviation from the reference position is a temporary change in the position of the microscope lens.

7. The method of claim 1, wherein step g) comprises:
   processing one or more components of the positional control signal using a loop compensation filter.

8. The method of claim 1, wherein the positional component comprises a displacement signal from which the drive component is calculated.

9. The method of claim 1, wherein step g) further comprises summing the drive component and the drive control signal to generate a signal for effecting the positional deviation from the microscope lens.

10. A system for controlling the position of a microscope lens comprising:
    a closed feedback control loop comprising a reference signal, a measurement signal, and a position control signal, the reference signal corresponding to a reference position of the microscope lens, the measurement signal corresponding to an actual position of the microscope lens, and the position control signal being configured for use in setting the position of the microscope lens, the reference signal and the measurement signal being used within the control loop to generate the positional control signal; and
    a controller configured to:
       receive signal data characteristic of a positional deviation of the microscope lens from the reference position, the signal data having a positional component and a drive component,
       modify the measurement signal using the positional component to produce a modified measurement signal,
       generate the positional control signal by comparing the modified measurement signal to the reference signal to prevent the control loop from compensating for the positional deviation, and
       use the drive component and the positional control signal to the effect the positional deviation of the microscope lens.

11. The system of claim 10, wherein the closed feedback control loop further comprises:
    a comparator for comparing the modified measurement signal and the reference signal to produce the positional control signal.

12. The system of claim 11, wherein the controller further comprises a loop compensation filter for processing the positional control signal.

13. The system of claim 11, wherein the controller further comprises a summation element that sums the drive component and the drive control signal to generate a signal for effecting the positional deviation of the microscope lens.

14. The system of claim 10, further comprising a displacement signal generator adapted to produce a displacement signal, wherein the positional component comprises the displacement signal.

15. The system of claim 10, further comprising a deviation signal generator for producing the drive component.

16. The system of claim 10, wherein the drive component comprises one of: a periodic signal and an impulse signal.

17. The system of claim 10, further comprising an encoder for generating the measurement signal.

18. The system of claim 10, further comprising a linear actuator for controlling the position of the microscope lens along a linear axis in response to a resultant positional control signal, wherein the linear axis is coaxial with an optical axis of the microscope lens.

19. The system of claim 18, further comprising a microscope lens mounted within a lens mounting, the lens mounting being operably connected to the linear actuator.

20. The system of claim 18, wherein the positional control signal comprises a modulated electrical current signal.

21. The system of claim 18, wherein the linear actuator comprises a voice coil actuator.

* * * * *